(12) United States Patent
Chu et al.

(10) Patent No.: US 6,718,376 B1
(45) Date of Patent: *Apr. 6, 2004

(54) MANAGING RECOVERY OF SERVICE COMPONENTS AND NOTIFICATION OF SERVICE ERRORS AND FAILURES

(75) Inventors: Jie Chu, Los Altos, CA (US); Aravind Sitaraman, Santa Clara, CA (US); Leslie Alan Thomas, San Francisco, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,304

(22) Filed: Dec. 15, 1998

(51) Int. Cl.$^7$ ............................................. G06F 15/173
(52) U.S. Cl. ........................ 709/223; 709/224; 714/4; 714/48; 370/216
(58) Field of Search ................................ 709/224, 223; 714/4, 48; 370/216

(56) References Cited

U.S. PATENT DOCUMENTS

| | | | |
|---|---|---|---|
| 5,276,801 A | 1/1994 | Heyen et al. | 395/162 |
| 5,283,783 A | 2/1994 | Nguyen et al. | 370/16.1 |
| 5,287,103 A | 2/1994 | Kasprzyk et al. | 340/825.52 |
| 5,361,250 A | 11/1994 | Nguyen et al. | 370/16.1 |
| 5,367,635 A | 11/1994 | Bauer et al. | 395/200 |
| 5,442,791 A | 8/1995 | Wrabetz et al. | 709/203 |
| 5,555,244 A | 9/1996 | Gupta et al. | 370/60.1 |
| 5,561,703 A | 10/1996 | Arledge et al. | 379/57 |
| 5,581,478 A | 12/1996 | Cruse et al. | 364/505 |
| 5,592,538 A | 1/1997 | Kosowsky et al. | 379/93 |
| 5,610,910 A | 3/1997 | Focsaneanu et al. | 370/351 |
| 5,621,721 A | 4/1997 | Vatuone | 370/16 |

(List continued on next page.)

FOREIGN PATENT DOCUMENTS

| | | | |
|---|---|---|---|
| WO | 97/13382 | 4/1997 | H04Q/7/22 |
| WO | 99/53408 | 10/1999 | G06F/15/16 |

OTHER PUBLICATIONS

Carrel, et al., "The TACACS+ Protocol–Version 1.78", Jan. 1997, printed from ftp://ftp–eng.cisco.com/gdweber/tac–rfc.1.78.txt on Oct. 23, 2000.

Active Software, Inc., "Active Software's Integration System", printed from http://www.activesw.com/products/products.html, on Jul. 24, 1998.

Cisco Systems, Inc., "CiscoDNS/DHCP Manager V.1.1", printed from http://www.combinet.com/warp/public/751/dnsmg/dnsmg_ds.htm, on Sep. 10, 1998, 4 pages.

Cisco Systems, Inc., "Cisco DNS/DHCP Manager V.1.1", printed from http://www.combinet.com/warp/public/751/dnsmg/dnsmg_pa.htm, on Sep. 10, 1998, 7 pages.

(List continued on next page.)

Primary Examiner—Frantz B. Jean
(74) Attorney, Agent, or Firm—Thelen Reid & Priest LLP

(57) ABSTRACT

A method and apparatus for providing management and maintenance to a node within a data communications network and to the composite data communications network. A network management application is started on a host which may be located at a network operation center. The management application is in communication with network nodes and services through adapters. A master daemon located at a node is activated. The master daemon starts a control adapter running on the node and if the control adapter fails the master daemon restarts the control adapter. The control adapter is capable of starting and stopping all services running on the node. Signals are communicated between the management application, the node and the services by way of adapters. Signaling provides for the exchange of useful event data related to the nodes and services running on the nodes.

128 Claims, 3 Drawing Sheets

U.S. PATENT DOCUMENTS

| | | | | |
|---|---|---|---|---|
| 5,671,354 | A | 9/1997 | Ito et al. | 395/187.01 |
| 5,673,265 | A | 9/1997 | Gupta et al. | 370/432 |
| 5,678,006 | A | 10/1997 | Valizadeh et al. | 395/200.02 |
| 5,694,547 | A | 12/1997 | Subramanian et al. | 709/224 |
| 5,715,394 | A | 2/1998 | Jabs | 395/200.11 |
| 5,717,604 | A | 2/1998 | Wiggins | 364/514 |
| 5,729,546 | A | 3/1998 | Gupta et al. | 370/434 |
| 5,740,176 | A | 4/1998 | Gupta et al. | 370/440 |
| 5,745,556 | A | 4/1998 | Ronen | 379/127 |
| 5,748,882 | A * | 5/1998 | Huang | 709/224 |
| 5,751,966 | A * | 5/1998 | Dauerer | 709/224 |
| 5,764,736 | A | 6/1998 | Shachar et al. | 379/93.09 |
| 5,764,756 | A | 6/1998 | Onweller | 379/242 |
| 5,768,521 | A | 6/1998 | Dedrick | 395/200.54 |
| 5,778,182 | A | 7/1998 | Cathey et al. | 395/200.49 |
| 5,787,253 | A | 7/1998 | McCreery et al. | 395/200.61 |
| 5,799,017 | A | 8/1998 | Gupta et al. | 370/419 |
| 5,812,529 | A | 9/1998 | Czarnik et al. | 370/245 |
| 5,835,727 | A | 11/1998 | Wong et al. | 395/200.68 |
| 5,838,682 | A | 11/1998 | Dekelbaum et al. | 370/401 |
| 5,838,683 | A | 11/1998 | Corley et al. | 370/408 |
| 5,852,812 | A | 12/1998 | Reeder | 705/39 |
| 5,862,404 | A | 1/1999 | Onaga | 395/828 |
| 5,867,495 | A | 2/1999 | Elliott et al. | 370/352 |
| 5,873,084 | A | 2/1999 | Bracho et al. | 707/10 |
| 5,889,774 | A | 3/1999 | Mirashrafi et al. | 370/352 |
| 5,905,715 | A | 5/1999 | Azarmi et al. | 370/244 |
| 5,905,736 | A | 5/1999 | Ronen et al. | 370/546 |
| 5,913,037 | A | 6/1999 | Spofford et al. | 395/200.56 |
| 5,922,051 | A | 7/1999 | Sidey | 709/223 |
| 5,968,116 | A | 10/1999 | Day, II et al. | 709/202 |
| 5,987,232 | A | 11/1999 | Tabuki et al. | 395/187.01 |
| 5,990,477 | A | 11/1999 | Tomita | 250/306 |
| 5,991,806 | A | 11/1999 | McHann, Jr. | 709/224 |
| 5,991,810 | A | 11/1999 | Shapiro et al. | 709/229 |
| 5,991,828 | A | 11/1999 | Horie et al. | 710/8 |
| 6,003,078 | A | 12/1999 | Kodimer et al. | 709/224 |
| 6,009,103 | A | 12/1999 | Woundy | 370/401 |
| 6,011,910 | A | 1/2000 | Chau et al. | 395/200.59 |
| 6,018,619 | A | 1/2000 | Allard et al. | 395/200.54 |
| 6,021,262 | A * | 2/2000 | Cote et al. | 709/224 |
| 6,021,429 | A | 2/2000 | Danknick | 709/208 |
| 6,023,507 | A | 2/2000 | Wookey | 380/21 |
| 6,023,724 | A | 2/2000 | Bhatia et al. | 709/218 |
| 6,026,087 | A | 2/2000 | Mirashrafi et al. | 370/389 |
| 6,026,440 | A | 2/2000 | Shrader et al. | 709/224 |
| 6,026,441 | A | 2/2000 | Ronen | 709/227 |
| 6,035,281 | A | 3/2000 | Crosskey et al. | 705/14 |
| 6,047,376 | A | 4/2000 | Hosoe | 713/201 |
| 6,091,951 | A | 7/2000 | Sturnioto et al. | 455/432 |
| 6,098,116 | A | 8/2000 | Nixon et al. | 710/8 |
| 6,119,160 | A | 9/2000 | Zhang et al. | 709/224 |
| 6,131,118 | A | 10/2000 | Stupek, Jr. et al. | 709/223 |
| 6,141,785 | A * | 10/2000 | Hur et al. | 714/748 |
| 6,145,089 | A * | 11/2000 | Le et al. | 714/4 |
| 6,148,338 | A | 11/2000 | Lachelt et al. | 709/224 |
| 6,148,410 | A | 11/2000 | Baskey et al. | 714/4 |
| 6,167,358 | A | 12/2000 | Othmer et al. | 702/188 |
| 6,185,600 | B1 | 2/2001 | Spence et al. | 709/203 |
| 6,185,613 | B1 | 2/2001 | Lawson et al. | 709/224 |
| 6,212,175 | B1 | 4/2001 | Harsch | 370/338 |
| 6,246,666 | B1 * | 6/2001 | Purcell et al. | 370/221 |
| 6,272,537 | B1 | 8/2001 | Kekic et al. | 709/223 |
| 6,363,411 | B1 * | 3/2002 | Dugan et al. | 709/202 |

OTHER PUBLICATIONS

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

IBM, "IBM introduces new subscriber management system for Internet service providers", Dec. 2, 1998, IBM News, p. 1.

Network Registrar, "Hot Products & Solutions—IP Address Management: A White Paper", American Internet Corporation, Bedford, MA, printed from http://www.american.com/ip–mgmt.html, on Jul. 24, 1998.

Rigney, et al., "Remote Authentication Dial In User Service (RADIUS)", Network Working Group, RFC 2138, Apr. 1997, pp. 1–57.

* cited by examiner

MANAGING RECOVERY OF SERVICE COMPONENTS AND NOTIFICATION OF SERVICE ERRORS AND FAILURES

BACKGROUND OF THE INVENTION

1. Field of the Invention

The present invention relates to a method and apparatus for managing and maintaining a data communication network. More particularly, the present invention relates to a method and apparatus for identifying the errors and failures created by service components within a distributed computer network, notifying system administrators of such errors and failures and an automated approach to restarting the failed components.

2. The Background

The ability to provide data communication networking capabilities to the personal user and the professional community is typically provided by telephone companies (Telcos) or commercial Internet Service Providers (ISPs) who operate network access points along the information superhighway. Network access points which are commonly referred to as Points of Presence or PoPs are located within wide area networks (WAN) and serve to house the network interfaces and service components necessary to provide routing, bridging and other essential networking functions. It is through these network access points that the user is able to connect with public domains, such as the Internet and private domains, such as the user's employer's intranet.

The ISPs and Telcos maintain control of the network interfaces and services components comprising the data communication network at locations commonly referred to as Network Operation Centers (NOCs). It is here, at the NOCs, where the ISPs and Telcos employ service administrators whose task is to maintain and manage a finite sector of the overall data communications network. Managing and maintaining the interfaces and services that encompass the network is complicated. The interfaces and services that a system administrator has responsibility for are not confined to the NOC, but rather remotely dispersed throughout the PoPs. For example, the NOC may be located in San Jose, Calif. and the services and interfaces for which the system administrator has responsibility for may be located at PoPs in San Francisco, Calif., Los Angeles, Calif. and Seattle, Wash. The remoteness of the interfaces and services make it difficult for the system administrator to oversee the system from one fixed location, such as the NOC.

It is the common knowledge of anyone who has used computers in a network environment that problems related to the interfaces and services are the rule and not the exception. The vast majority of these problems are minor in nature and do not require the system administrator to take action. Networks have been configured in the past so that these minor errors are self-rectifying; either the interface or service is capable of correcting its own error or other interfaces or services are capable of performing a rescuing function. In other situations the problems that are encountered within the network are major and require the system administrator to take action; i.e., physically rerouting data traffic by changing interfaces and services.

It is the desire of the service providers to have a maintenance and management system for a data communication network that allows the system administrator the ability to accumulate quality and reliability data on all the interfaces and services in use. If a system administrator has real-time access to the performance history of each interface and service the administrator can then predict future performance. For example, the system administrator can assess the performance history for a given service over a specified period of time. If the history shows that the service has performed below maximum capability or a trend in recent self-corrected errors has arisen, then the system administrator can make adjustments accordingly. These adjustments may be, for example, choosing to shut down that particular service or limiting the amount of data traffic volume encountered by that service. Having the capability to assess prior performance history and make adjustments accordingly allows the service provider to be pro-active and to limit future major failures from occurring.

While the service providers want access to information pertaining to any and all errors occurring within the distributed communication network, they also desire that the maintenance and management system be as self-rectifying as possible. Not only should minor errors be self-corrected, but major failures should be self-corrected as well. This includes using necessary watchdog mechanisms that cause failed components and services to be restarted. Additionally, the watchdog itself must be self-rectifying as an added measure of overall reliability insurance. In this manner the service provider is able to maintain and manage the data communication network without the need for having more personnel than necessary to monitor and manipulate the network on an ongoing basis.

BRIEF DESCRIPTION OF THE INVENTION

A method and apparatus for providing management and maintenance to a node within a data communications network and a method and apparatus for providing management and maintenance to the composite data communications network. A master daemon located at the node is activated. The master daemon starts a control adapter running on the node and if the control adapter stops then the master daemon restarts the control adapter. The control adapter is capable of starting and stopping all services running on the node. Signals are communicated between the node and the services by way of adapters. Signaling provides for the exchange of useful event data related to the nodes and services comprising the data communication network.

In another aspect of the invention, a network management application is started on a host located at a network operation center. The network management application is in communication with network nodes and services through an adapter. Signals are communicated between the management application, the node and the services by way of adapters. Signaling provides for the exchange of useful event data related to the nodes and services running on the nodes.

In another aspect of the invention, the network management application has an association with a database of information. The network management application is in communication with an information bus through an adapter so as to update the contents of the data base from events signaled by adapters located at the node of the data communications network.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

In accordance with a presently preferred embodiment of the present invention, the components, processes and/or data structures are implemented using devices implementing C++ programs running on an Enterprise 2000™ server running Sun Solaris™ as its operating system. The Enterprise 2000™ server and Sun Solaris™ operating system are products available from Sun Microsystems, Inc of Mountain View, Calif. Different implementations may be used and may include other types of operating systems, computing platforms, computer programs, firmware and/or general purpose machines. In addition, those of ordinary skill in the art will readily recognize that the devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concepts herein disclosed.

Figure 1:
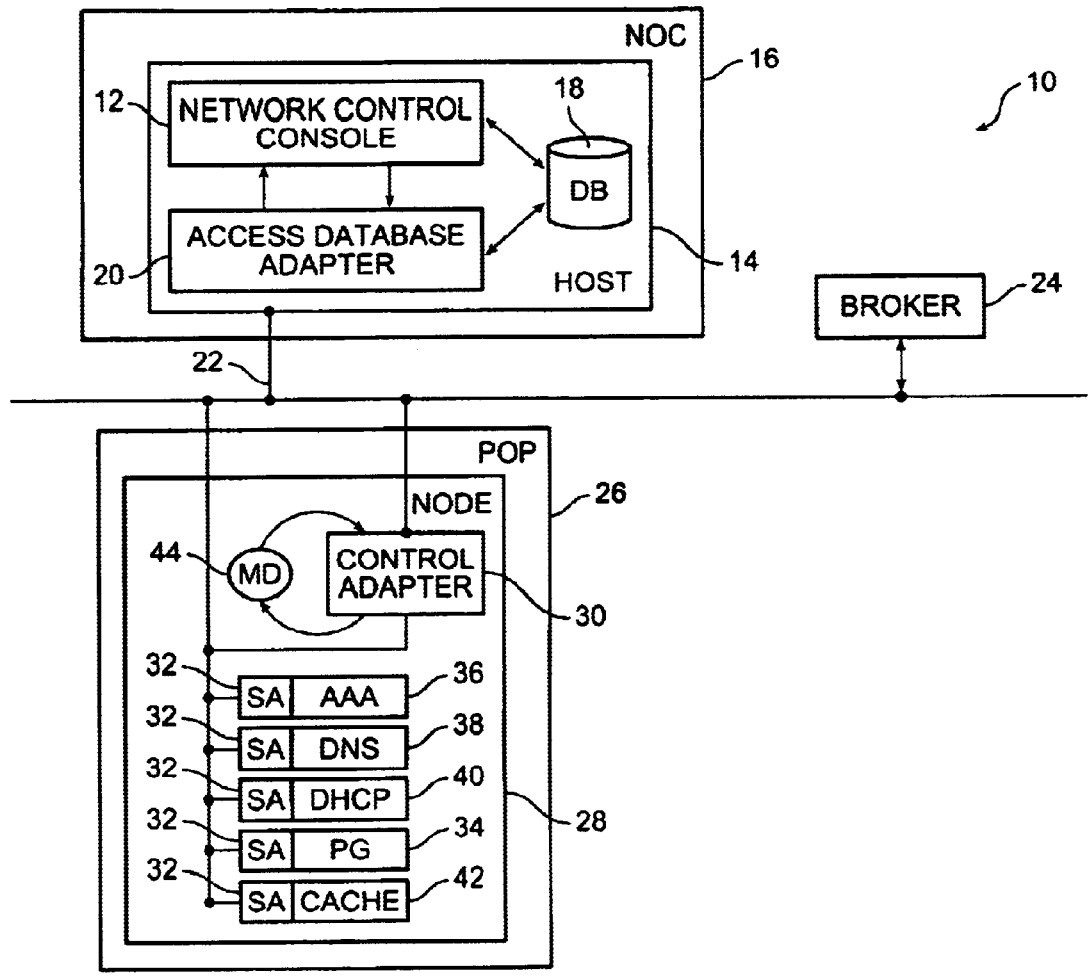
FIG. 1 is a schematic drawing of a management and maintenance system for a data communications network, in accordance with a presently preferred embodiment in the present invention.

Referring to FIG. 1, shown is a schematic diagram of a data communications network 10 incorporating the network management system of a presently preferred embodiment of the present invention. A network control console (NCC) 12 is physically located on a host 14 within a Network Operation Center (NOC) 16. The NCC 12 is an application program running on the host 14. The NCC 12 monitors and manages the data network management system and serves as the communication interface between the data network management system and a systems administrator. A systems administrator is an individual employed by a network service provider who maintains a portion of the overall data communications network 10. The NCC 12 is in communication with a database 18 and an access database adapter 20.

The database 18 and access database adapter 20 can run on the same host 14 as the NCC 12, as depicted in FIG. 1, or the database 18 and the access database adapter 20 can be located on other remote devices. The database 18 stores information related to the various components and services comprising the data communications network 10 being managed. The system administrator accesses the information in the database 18, as needed, in conjunction with the network control console 12 to perform the overall network management task. The access database adapter 20 is in communication with both the database 18 and the NCC 12.

This adapter, and other adapters in the invention, provide bi-directional mapping of information between the NCC 12 and other services comprising the data communications network 10. Adapters, such as the access database adapter 20 subscribe to and publish events. An event is an independent entity that contains an unspecified amount of, generally, non-time critical information. For example, the access database adapter 20 receives commands from the NCC 12 to publish an event. The information contained in the event may be found in the NCC's request or the access database adapter 20 may communicate with the database 18 to find the required information. A detailed discussion of the specific events and the information found therein is provided later in this disclosure. The event is then published to other services and components within the data network management system across an information bus 22.

The information bus 22 that serves as the transportation medium for a presently preferred embodiment of the present invention can be Common Object Request Broker Architecture (CORBA)-based. The CORBA-based information bus is capable of handling the communication of events to and from objects in a distributed, multi-platform environment. The concept of a CORBA-based information bus is well known to those of ordinary skill in the art. Other acceptable communication languages can be used as are known by those of ordinary skill in the art.

CORBA provides a standard way of executing program modules in a distributed environment. A broker, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Figure 2:
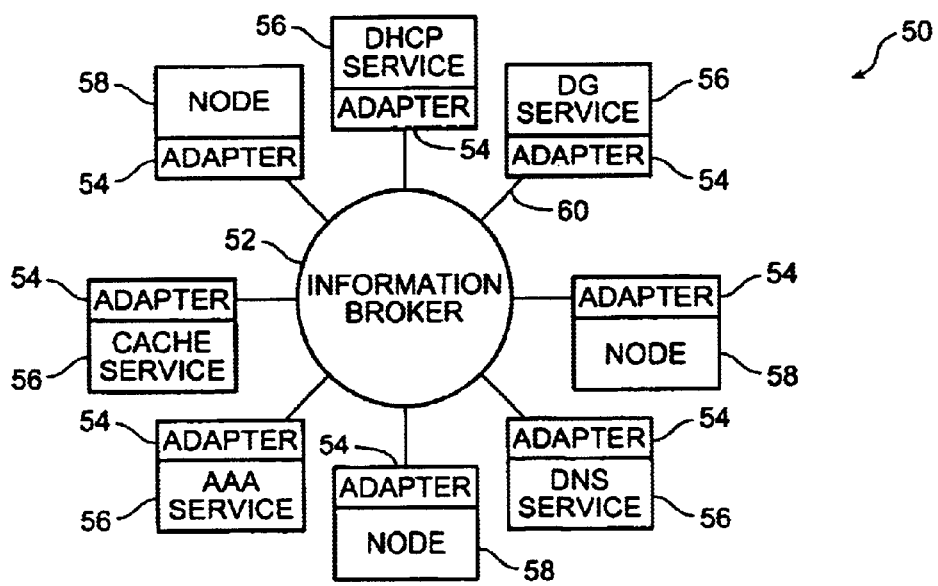
FIG. 2 is a schematic drawing of a Enterprise Application Integration (EAI) system highlighting the relationship between an information broker and adapters, in accordance with a presently preferred embodiment of the present invention.

In accordance with a presently preferred embodiment of the present invention an Enterprise Application Integration (EAI) system is used to broker the flow of information between the various services and adapters comprising the data network management system of the present invention. The implementation of EAI systems in networking environments are well known by those of ordinary skill in the art. An example of an EAI system that can be incorporated in the presently preferred invention is the ActiveWorks Integration System, available from Active Software of Santa Clara, Calif. As shown in FIG. 2, such an EAI system 50 uses an information broker 52 as the hub of the system. The information broker 52 acts as the central control and storage point for the system. The information broker 52 can reside on a server and serves to mediate requests to and from networked clients; automatically queuing, filtering and routing events while guaranteeing delivery. The information broker 52 is capable of storing subscription information and using such subscription information to determine where published information is to be sent. Referring back to FIG. 1, the information broker 24 is shown as being located at a point along the information bus 22. In most instances the, broker will be located within the same NOC 16 as the host 14 that runs the NCC 12 application. Another key feature to the EAI system 50 is the use of adapters 54 that allow users of the EAI system 50 to integrate diverse applications and other information when using the integration system. Adapters 54 provide bidirectional mapping of information between the an application's native format and integration system events, enabling all custom and packaged applications, databases, and Internet and extranet applications to exchange information. As shown in FIG. 2 the adapters 54 run on the various services 56 and network nodes 58 from which information is published and subscribed on to an information bus that has its hub at the broker 52.

Referring back to FIG. 1 the information bus is in communication with a Point of Presence (POP) 26 within the data communications network 10. The PoP 26 is one of many PoPs that the information bus 22 is in communication with. Located within PoP 26 is a host or node 28. The node 28 is in communication with the information bus 22 through control adapter 30 and one or more service adapters 32 that are connected with the various services that are used on the node 28.

By way of example, the node 28 of FIG. 1 is configured with a protocol gateway service 34, an Authentication, Authorization and Accounting (AAA) service 36, a Domain Name System (DNS) service 38, a Dynamic Host Configuration Protocol (DHCP) service 40 and a cache service 42. Those of ordinary skill in the art will appreciate that the services shown are not intended to be limiting and that other services and other service configurations can be used without departing from the inventive concepts herein disclosed.

The protocol gateway service 34 is used to couple the network user to the data communication network. The protocol gateway service 34 functions as an interface that allows access requests received from a user to be serviced using components that may communicate using different protocols. A typical protocol gateway service 34 may be able to support different user access methodologies, such as dial-up, frame relay, leased lines, ATM (Asynchronous Transfer Mode), ADSL (Asymmetric Digital Subscriber Line) and the like. Used in conjunction with the protocol gateway service 34, the AAA service 36 performs user authorization and user accounting functions. The AAA service 36 stores user profile information and tracks user usage. The profile information stored in the AAA service 36 is proxied to the protocol gateway service 34 when a network user desires network access.

The DNS service 38 is used to return Internet Protocol (IP) addresses in response to domain names received from a protocol gateway service 34, for example, if the DNS service 38 receives a domain name from the protocol gateway service 34, it has the capability to locate the associated IP address from within the memory of the DNS service 38 (or another DNS service) and return this IP address to the protocol gateway service 34.

The DHCP service 40 is used as a dynamic way of assigning IP addresses to the network users. The memory service 42 is a simple cache performing data storage functions. The use of AAA services, protocol gateway services, DNS services, DHCP services and memory services are well known to those of ordinary skill in the art.

Each of these services is in communication with a corresponding service adapter 32. The service adapter 32 subscribes to and publishes various events on the information bus 22. The service adapter 32 is configured so that it subscribes to events published by the access database adapter 20 of the NCC 12 and the control adapter 30 of the node 28. The service adapter 32 also publishes events to the access database adapter 20 of the NCC 12 and the control adapter 30 of node 28. A detailed discussion of the events published by and subscribed to by the service adapter 32 is provided later in this discussion.

A control adapter 30 is located within node 28. A control adapter 30 runs on all nodes that have services that require managing by the NCC 12. The control adapter 30 monitors the state and status of the node 28 and allows the system administrator to remotely start and stop services on the node 28. Additionally, the control adapter 30 serves to insure that the services within node 28 remain viable. Control adapter 30 polls the services on a prescribed time basis to insure that all specified services remain operational. The system administrator may define the prescribed polling interval. If the results of the polling operation determine that a particular service has failed then the control adapter 30 initiates an automatic restart process. If the restart process fails to revive the service, the control adapter 30 will again initiate the automatic restart process. The system administrator will determine how many unsuccessful automatic restart processes will be undertaken before the control adapter 30 sends an event to the NCC 12 that notifies the system administrator that the attempt to restart a service was unsuccessful. In this instance, the event that is forwarded to the NCC 12 via the information bus 22 is an exception event. A detailed discussion of an exception event and other events published by and subscribed to by the control adapter 30 is provided later in this discussion.

A master daemon 44 is in communication with the control adapter 30. The function of the master daemon is to insure that the control adapter 30 remains viable. The master daemon 44 starts the control adapter 30 initially and restarts the control adapter 30 if a failure occurs. In this sense, the master daemon 44 is defined as a parent process and the control adapter 30 is the child process of the master daemon 44. The master daemon 44 is an application that is kept extremely simple so as to minimize the likelihood that it will ever crash. At node 28 installation, the master daemon 44 application is copied to a directory and is started once the node 28 is booted. The master daemon 44 sets up a signal handler to handle SIGCHILD signals and starts the control adapter 30 as a child process. A SIGCHILD signal is a signal coming from the child process, in this instance the control adapter 30, that notifies the master daemon 44 that the child process has failed (or its absence can indicate a failure). Once the master daemon 44 receives the SIGCHILD signal from the control adapter 30 the master daemon 44 is configured to automatically restart the control adapter 30.

The following is an exemplary listing and definition of some of the events published by and subscribed to by the access database adapter 20, the control adapter 30 and the service adapters 32. This listing is by way of example and is not intended to be exhaustive or limiting in any way. Other events are possible and can be used in this invention without departing from the inventive concepts herein disclosed.

The control adapter 30 and the service adapters 32 publish "heartbeat" events to signal that the adapters are still alive and to periodically report to the NCC 12 other essential information. The NCC 12 uses these heartbeats to show the system administrator that the node on which the control adapter 30 is running is operational or that a service on which the service adapter 32 is running is still operational. These heartbeat events are published periodically and the frequency of the heartbeats is configured by a default file or dynamically by the NCC 12 by way of a "configure"0 event. The NCC 12 receives the heartbeat events though the access database adapter 20 that subscribes to the events. When the control adapter 30 stops sending heartbeats, the NCC 12 signals that the node 28 has died. The crashed control adapter 30 should be restarted by the master daemon 44. When this failure occurs it will also publish an "exception" event to the NCC 12 through the access database adapter 20. When a service adapter 32 stops sending heartbeats, the NCC 12 signals that a service has died. The crashed service adapter 32 should be restarted by the control adapter 30. An example of the information contained within a heartbeat event includes the Global Unique Identifier (GUID) of the publisher (to identify this particular heartbeat from other service heartbeats), a time stamp, the number of data packets received and processed, the number of packets in queue, the number of packets timed out and the rate at which packets are being received.

The access database adapter 20 of the NCC 12 publishes "configure" events to the control adapter 30 and the service adapters 32. Configure events are published to configure the control adapter 30 or service adapters 32 upon initial start up of the control adapter 30 or service adapter 32 or to modify a preexisting configuration. A configure event can be delivered to a service adapter 32 directly from the access database adapter 20 at the NCC 12 or the configure event can go through the control adapter 30. The control adapter 30 and the service adapters 32 update their corresponding configure files upon receiving a configure event. An example of the information contained within a configure event includes the GUID of the publisher, the GUID of the subscriber, listening port configuration, sink port configuration, protocol handler information, engine data and facility data.

The access database adapter 20 of the NCC 12 publishes "start" events that are subscribed to by the control adapter 30 to cause the control adapter 30 to start up a specific service or multiple services. Since the control adapter 30 is always responsible for starting a service, the start events are always subscribed to by the control adapter 30 as opposed to the service adapters 32. An example of the information contained within a start event includes the GUID of the publisher, the GUID of the subscribing control adapter, the GUID of the service to be started, the service name and the absolute path where the service binary resides. The access database adapter 20 of the NCC 12 also publishes "stop" events that are subscribed to by the control adapter 30 to cause the control adapter 30 to shut down a specific service or multiple services. Since the control adapter 30 is always responsible for stopping a service, the stop events are always subscribed to by the control adapter 30 as opposed to the service adapters 32. Once the control adapter 30 receives the stop event from the access database adapter 20, it proxies the stop event to the service adapter 32 communicating with the service that is desired to be stopped. The control adapter 30 allows the service sufficient time to shutdown. If the service does not respond to the stop event and continues running, the control adapter 30 can explicitly kill the service based on the process ID found in the configuration file. An example of information contained within a stop event includes the GUID of the publisher, the GUID of the subscribing control adapter, the GUID of the service to be stopped and the name of the service to be stopped.

The control adapter 30 and the service adapters 32 publish "exception" events that report to the subscribing access database adapter 20 of the NCC 12 when an abnormal condition exists within the node 28 or the service. Each time an exception condition exists, the control adapter 30 or the service adapter 32 will publish an exception event. Exception events can be classified as either an error, a warning or information. When the exception event reports an error the error will have a security level associated with it. The security level can include minor, recoverable, sever, critical, and unrecoverable. If the error condition reaches a severity level that causes the node 28 to fail, then along with the exception event publication, the master daemon 44 is activated and attempts to restart the control adapter 30. If the error condition reaches a severity level that causes a service to fail, then along with the exception event publication, the control adapter 30 attempts to restart the service adapter 32. An example of the information found in an exception event includes the GUID of the publisher, the classification of the exception (error, warning or info), the severity level if the classification is an error and a description of the exception condition.

If the exception event is classified as an error and if the severity of the error reaches such a level that requires immediate attention by a system administrator, then NCC 12 has the capability to perform various functions to notify the system administrator. These notification functions can include, but are not limited to, having the NCC 12 telephone the system administrator, fax the system administrator, send e-mail notification to the system administrator or send a page message to a system administrator.

The access database adapter 20 of the NCC 12 publishes "discover" events subscribed to by either the control adapter 30 or the service adapters 32. The discover events request that identity information be sent back to the NCC 12 by the control adapter 30 or the service adapters 32. Additionally, the control adapter 30 can publish a discover event to check if one specific service adapter 32 is still responsive. The control adapter 30 and the service adapters 32 respond to the discover event by publishing an "identity" event. The identity event provides the NCC 12 with detailed information about the service. The detailed information can be stored in the NCC database 18 for future reference. An example of information contained within a discover event includes the GUID of the publisher, the GUID of the intended subscriber and status performance data requests. When the discover event includes status performance data requests the control adapter 30 or the service adapters 32 will respond with a "status" event. The status event provides the NCC 12 with a report of the performance of the node 28 or service. The detailed performance information contained within a status event can be stored in the NCC database 18 for future reference. The information supplied by the status event is used by the system administrator to access the overall performance and reliability of the various nodes and services throughout the data communication network 10.

The control adapter 30 publishes "race" events to report back to subscribing NCCs when two or more conflicting events from two or more NCCs have been received by a control adapter within a specified short period of time. This event reports the situation where two or more NCCs send out conflicting operation events (i.e. a start event and a stop event) to a control adapter 30 instantaneously, or nearly instantaneously. The control adapter 30 will perform the events in the order they arrive, and then publish a race event to the NCCs. The time span for having conflicting events can either be configured in the configure event or by default the time span for a racing event is defined at 5 seconds. An example of information contained within a race event includes the GUID of the publisher, the GUID of the NCCs, the nature of the conflict and a description message.

The access database adapter 20 of the NCC 12 can publish a "DoCommand" event that causes the subscribing control adapter 30 to execute a pre-defined script existing on the control adapter 30. This type of event can be issued manually by the system administrator or it can be automatically triggered based on certain events being published. An example of such a script would include, but not be limited to, a script to authorize the control adapter 30 to shutdown a database if certain conditions occur. An example of information contained within a DoCommand event includes the GUID of the publisher, the GUID of the subscriber and the script to be executed on the subscribing node.

Figure 3:
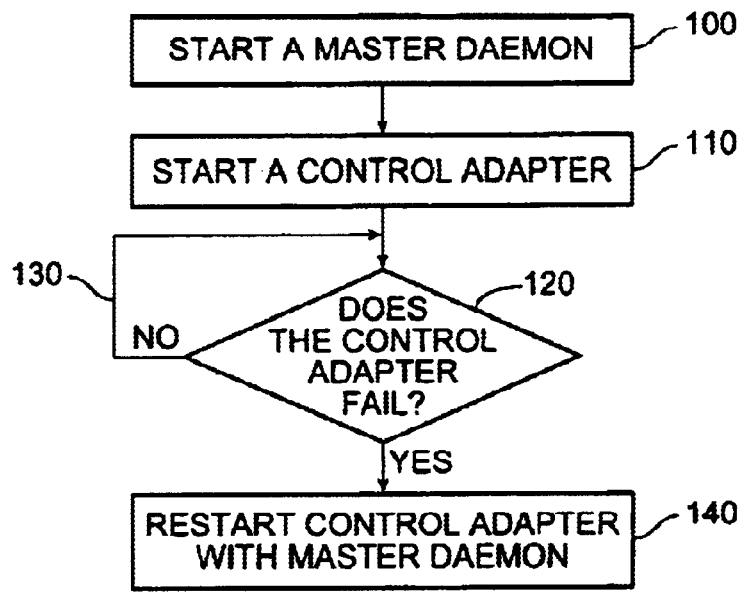
FIG. 3 is a flow diagram of a method for management and maintenance of a node within a data communications network, in accordance with a presently preferred embodiment of the present invention.

FIG. 3 is a flow chart diagram illustrating a method for managing the node of a data communications network, in accordance with a presently preferred method of the present invention. At 100, the master daemon is started. At node installation, the master daemon is copied to a directory and is started once the node is rebooted. The master daemon sets up a signal handler to handle SIGCHILD signals. A SIGCHILD signal is a signal coming from the child process, in this instance a control adapter, serves as the child process. At 110, the control adapter is started by the master daemon executing a command to start the control adapter. Once the control adapter is started it is viewed as a child process controlled by the master daemon parent process. At 120, the master daemon is in constant standby mode waiting to re-start the control adapter should the control adapter fail. At 130, if the control adapter does not fail the master daemon continues monitoring the control adapter until a failure occurs. At 140, if the control adapter fails the master daemon restarts the control adapter. The re-start is accomplished by the control adapter sending a SIGCHILD signal to the master daemon. The master daemon is implemented to automatically restart the control adapter upon receiving the SIGCHILD signal.

Figure 4:
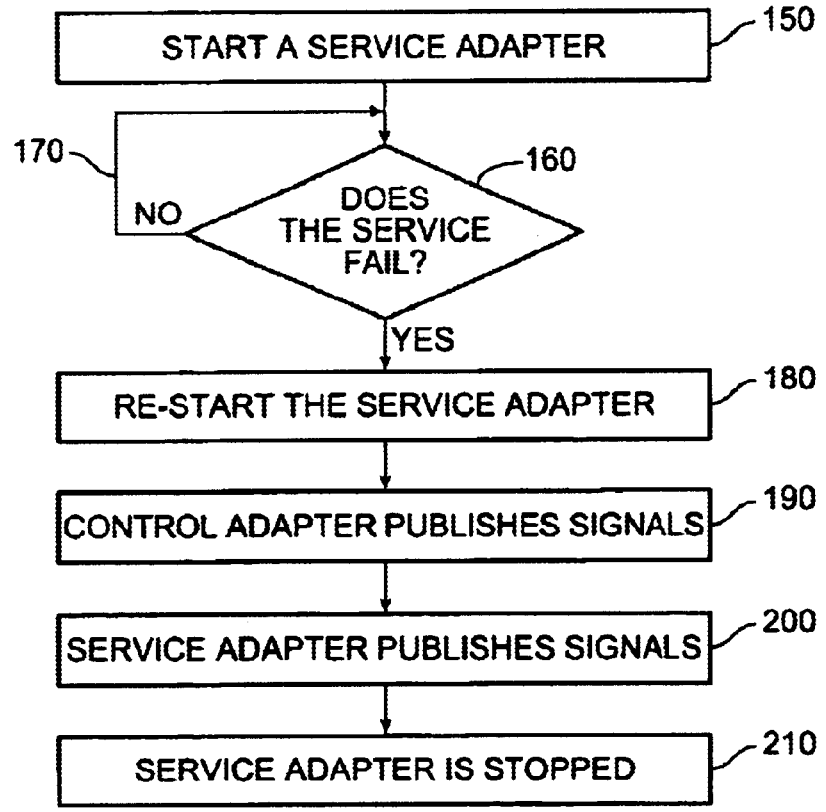
FIG. 4 is a flow diagram of additional aspects of the method for management and maintenance of a node within a data communication network, in accordance with a presently preferred embodiment of the present invention.

FIG. 4 is a flow chart diagram illustrating further methodology for managing the node of a data communications network, in accordance with a presently preferred embodiment of the present invention. At 150, the control adapter starts a service running on the node by activating the service adapter. The command for this start process may be found in the control adapter's database or it may come from a signal over the information bus. At 160, the control adapter is constantly polling the service adapter to insure that the service adapter is functional. At 170, if the service does not fail the control adapter continues polling the service adapter until a determination is made that the service has failed. At 180, if the results of the polling process determine that a service failure has occurred then the control adapter initiates an automatic restart process.

At 190, the control adapter sends out signals over an information bus. These signals, that are published by the control adapter, provide information to subscribing entities. The signals that a control adapter publishes include, but are not limited to, notification that the node on which the control adapter is running is still functional, notification that the node has experienced an error, configuration data sent to a service adapter, identity and performance data sent in response to requests for such data, and notification to devices sending conflicting inputs. At 200, the service adapter sends out signals over the information bus. These signals, that are published by the control adapter, provide information to subscribing entities. The signals that a service adapter publishes include, but are not limited to, notification that the service on which the service adapter is running is still functional, notification that the service has experienced an error and identity and performance data sent in response to requests for such data. At 210, a service is stopped by sending a signal from the control adapter to the service adapter requesting that the service be stopped.

Figure 5:
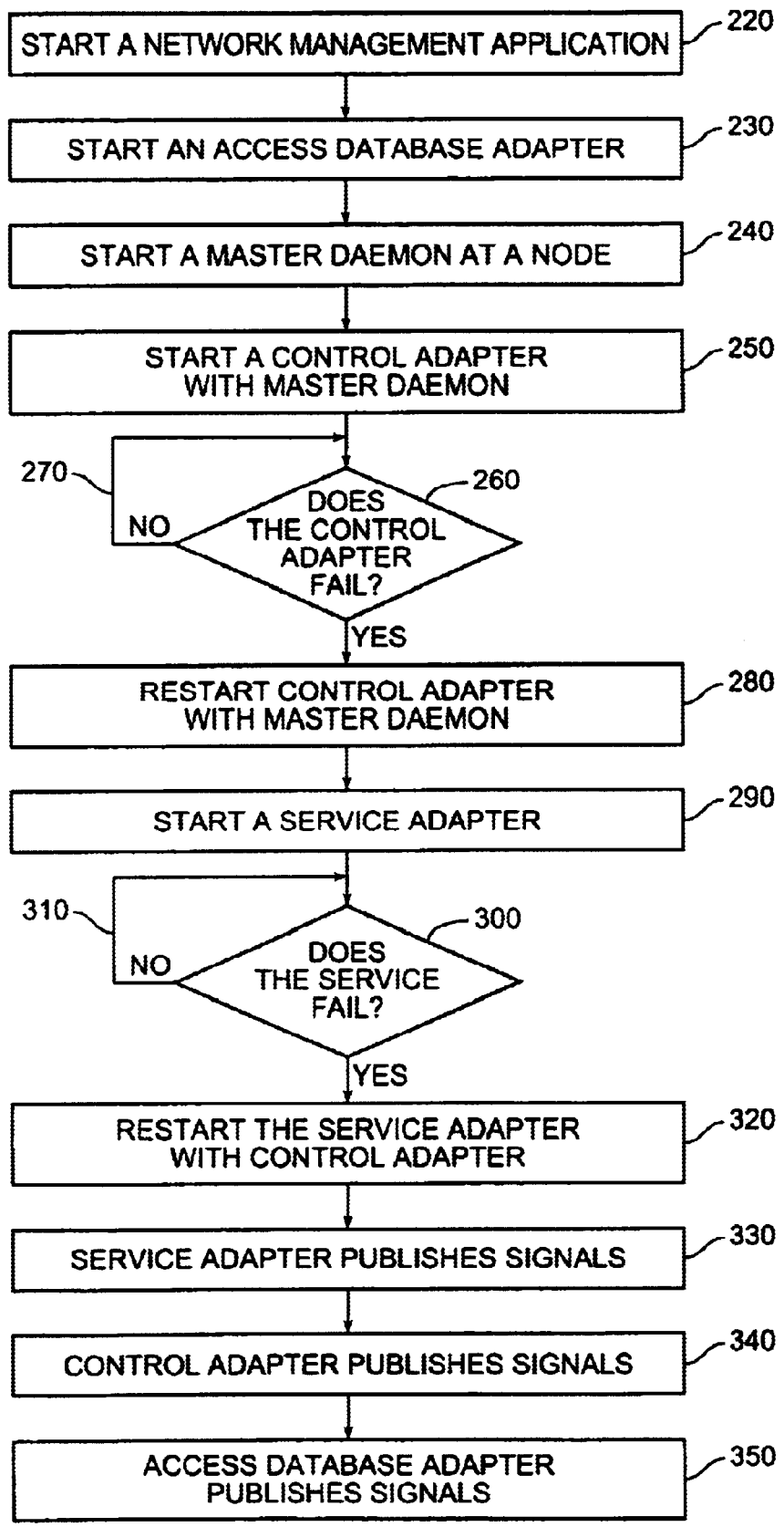
FIG. 5 is a flow diagram of a method for management and maintenance of a data communications network, in accordance with a presently preferred embodiment of the present invention.

FIG. 5 is a flow chart diagram illustrating a method for managing a data communications network, in accordance with a presently preferred method of the present invention. At 220, a network management application is started on a host that may be located within a NOC. An example of a network management application is the network control console (NCC). At 230, an access database adapter that is in communication with the network management application is started. At 240, the master daemon is started. At node installation, the master daemon is copied to a directory and is started once the node is rebooted. The master daemon sets up a signal handler to handle SIGCHILD signals. A SIGCHILD signal is a signal coming from the child process, in this instance a control adapter, serves as the child process. At 250, the control adapter is started by the master daemon executing a command to start the control adapter. Once the control adapter is started it is viewed as a child process controlled by the master daemon parent process. At 260, the master daemon is in constant standby mode waiting to re-start the control adapter should the control adapter fail. At 270, if the control adapter does not fail the master daemon continues monitoring the control adapter until a failure occurs. At 280, if the control adapter fails the master daemon restarts the control adapter. The re-start is accomplished by the control adapter sending a SIGCHILD signal to the master daemon. The master daemon is implemented to automatically restart the control adapter upon receiving the SIGCHILD signal.

At 290, the control adapter starts a service running on the node by activating the service adapter. The command for this start process may be found in the control adapter's database or it may come from a signal over the information bus. At 300, the control adapter is constantly polling the service adapter to insure that the service adapter is functional. At 310, if the service does not fail the control adapter continues polling the service adapter until a determination is made that the service has failed. At 320, if the results of the polling process determine that a service failure has occurred then the control adapter initiates an automatic restart process.

At 330, the control adapter sends out signals over an information bus. These signals, that are published by the control adapter, provide information to subscribing entities. The signals that a control adapter publishes include, but are not limited to, notification that the node on which the control adapter is running is still functional, notification that the node has experienced an error, configuration data sent to a service adapter, identity and performance data sent in response to requests for such data, and notification to devices sending conflicting inputs. At 340, the service adapter sends out signals over the information bus. These signals, that are published by the control adapter, provide information to subscribing entities. The signals that a service adapter publishes include, but are not limited to, notification that the service on which the service adapter is running is still functional, notification that the service has experienced an error and identity and performance data sent in response to requests for such data. At 210, a service is stopped by sending a signal from the control adapter to the service adapter requesting that the service be stopped. At 350, the access database adapter associated with the network management application sends out signals over the information bus. These signals, that are published by the access database adapter, provide information to subscribing entities. The signals that an access database adapter publishes include, but are not limited to, configuration commands for the service adapter or control adapter, start commands for a service adapter to start a service, stop commands for a service adapter to stop a service, a request for identity and performance data for a node or service and commands to execute a script at the control adapter.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A method for managing a node of a data communication network, comprising:
   starting a master daemon;
   starting a control adapter with said master daemon;
   starting at least one service with said control adapter, said service including a service adapter in communication with said control adapter;
   generating a plurality of heartbeat events with said control adapter and said service adapter; and
   publishing said plurality of heartbeat events to an information bus such that subscribing adapters may receive said plurality of heartbeat events.

2. The method of claim 1 further comprising:
   restarting said control adapter with said master daemon should said control adapter ever stop publishing said heartbeat events for longer than a predetermined time.

3. The method of claim 1 further comprising:
   restarting said service adapter with said control adapter should said service adapter ever stop publishing said heartbeat events for longer than a predetermined time.

4. The method of claim 1 further comprising:
   starting an Authentication, Authorization and Accounting (AAA) service with said control adapter, said AAA service including a service adapter in communication with said control adapter.

5. The method of claim 1 further comprising:
   starting a Domain Name Service (DNS) with said control adapter, said DNS including a service adapter in communication with said control adapter.

6. The method of claim 1 further comprising:
   starting a Dynamic Host Configuration Protocol (DHCP) service with said control adapter, said DHCP service including a service adapter in communication with said control adapter.

7. The method of claim 1 further comprising:
   starting a protocol gateway service with said control adapter, said protocol gateway service including a service adapter in communication with said control adapter.

8. The method of claim 1 further comprising:
   starting a cache service with said control adapter, said cache service including a service adapter in communication with said control adapter.

9. The method of claim 1 further comprising:
   signaling at said control adapter an error occurrence within said control adapter; and
   publishing an exception event on to said information bus.

10. The method of claim 1 further comprising:
    signaling at said control adapter when said control adapter receives two or more conflicting signals from two or more sources within a specified period of time; and
    publishing a race event on to said information bus.

11. The method of claim 1 further comprising:
    signaling at said control adapter the identity of said control adapter in response to said control adapter receiving a signal requiring identity status; and
    publishing an identity event of said control adapter on to said information bus.

12. The method of claim 1 further comprising:
    signaling at said control adapter the configuration data for said service adapter; and
    publishing a configuration event on to said information bus.

13. The method of claim 1 further comprising:
    signaling at said service adapter an error occurrence within said service; and
    publishing an exception event on to said information bus.

14. The method of claim 1 further comprising:
    signaling at said service adapter the identity of said service adapter in response to said service adapter receiving a signal requiring identity status; and
    publishing an identity event on to said information bus.

15. The method of claim 1 wherein said heartbeat events include Global Unique Identifiers of publishers.

16. The method of claim 1 wherein said heartbeat events include time stamps.

17. The method of claim 1 wherein said heartbeat events include information regarding a number of packets received and processed by the node.

18. The method of claim 1 wherein said heartbeat events include information regarding a number of packets in queue in the node.

19. The method of claim 1 wherein said heartbeat events include information regarding a number of packets timed out.

20. The method of claim 1 wherein said heartbeat events include information regarding a rate at which packets are received by the node.

21. A method for managing a data communication network, comprising:
    starting a master daemon;
    starting a control adapter with said master daemon;
    starting at least one service with said control adapter, said service including a service adapter in communication with said control adapter;
    generating a plurality of heartbeat events with said control adapter and said service adapter; and
    publishing said plurality of heartbeat events to an information bus such that subscribing adapters may receive said plurality of heartbeat events, said information bus in communication with a network management application and an access database adapter, said access data base adapter in communication with said network management application.

22. The method of claim 21 further comprising:
    restarting said control adapter with said master daemon should said control adapter ever stop publishing said heartbeat events for longer than a predetermined time.

23. The method of claim 21 further comprising:
    restarting said service adapter with said control adapter should said service adapter ever stop publishing said heartbeat events for longer than a predetermined time.

24. The method of claim 21 further comprising:
    starting an Authentication, Authorization and Accounting (AAA) service with said control adapter, said AAA service including a service adapter in communication with said control adapter.

25. The method of claim 21 further comprising:
    starting a Domain Name Service (DNS) with said control adapter, said DNS including a service adapter in communication with said control adapter.

26. The method of claim 21 further comprising:
starting a Dynamic Host Configuration Protocol (DHCP) service with said control adapter, said DHCP service including a service adapter in communication with said control adapter.

27. The method of claim 21 further comprising:
starting a protocol gateway service with said control adapter, said protocol gateway service including a service adapter in communication with said control adapter.

28. The method of claim 21 further comprising:
starting a cache service with said control adapter, said cache service including a service adapter in communication with said control adapter.

29. The method of claim 21 further comprising:
signaling at said control adapter an error occurrence within said control adapter; and
publishing an exception event on to said information bus.

30. The method of claim 21 further comprising:
signaling at said control adapter when said control adapter receives two or more conflicting signals from two or more sources within a specified period of time; and
publishing a race event on to said information bus.

31. The method of claim 21 further comprising:
signaling at said control adapter the identity of said control adapter in response to said control adapter receiving a signal requiring identity status; and
publishing an identity event of said control adapter on to said information bus.

32. The method of claim 21 further comprising:
signaling at said control adapter the configuration data for said service adapter; and
publishing a configuration event on to said information bus.

33. The method of claim 21 further comprising:
signaling at said service adapter an error occurrence within said service; and
publishing an exception event on to said information bus.

34. The method of claim 21 further comprising:
signaling at said service adapter the identity of said service adapter in response to said service adapter receiving a signal requiring identity status; and
publishing an identity event on to said information bus.

35. The method of claim 21 further comprising:
signaling at said access database adapter configuration data for said service adapter; and
publishing a configure event to said information bus.

36. The method of claim 21 further comprising:
signaling at said access database adapter configuration data for said control adapter; and
publishing a configure event to said information bus.

37. The method of claim 21 further comprising:
signaling at said access database adapter for said service to begin operating; and
publishing a start event on said information bus.

38. The method of claim 21 further comprising:
signaling at said access database adapter for said service to stop; and
publishing a stop event on to said information bus.

39. The method of claim 21 further comprising:
signaling at said access database adapter for the identity of said control adapter; and
publishing an identity event on to said information bus.

40. The method of claim 21 further comprising:
signaling at said access database adapter for the identity of said service adapter; and
publishing an identity event on to said information bus.

41. The method of claim 21 further comprising:
signaling at said access database adapter for said control adapter to execute a script; and
publishing a DoCommand event on to said information bus.

42. The method of claim 21 wherein said heartbeat events include Global Unique Identifiers of publishers.

43. The method of claim 21 wherein said heartbeat events include time stamps.

44. The method of claim 21 wherein said heartbeat events include information regarding a number of packets received and processed by the node.

45. The method of claim 21 wherein said heartbeat events include information regarding a number of packets in queue in the node.

46. The method of claim 21 wherein said heartbeat events include information regarding a number of packets timed out.

47. The method of claim 21 wherein said heartbeat events include information regarding a rate at which packets are received by the node.

48. A node within a data communication network, comprising:
a master daemon;
a control adapter activated by said master daemon, said control adapter in communication with an information bus over which are published heartbeat events from said control adapter such that subscribing adapters may receive said heartbeat events;
a service adapter in communication with said control adapter and said information bus over which are published heartbeat events from said service adapter such that subscribing adapters may receive said plurality of heartbeat events; and
at least one service running on said node, said service operatively coupled to said service adapter.

49. The node of claim 48 wherein said service is an Authentication, Authorization and Accounting (AAA) service, said AAA having a service adapter in communication with said information broker.

50. The node of claim 48 wherein said service is a Domain Name Service (DNS), said DNS having a service adapter in communication with said control adapter.

51. The node of claim 48 wherein said service is a Dynamic Host Configuration Protocol (DHCP) service, said DHCP service having a service adapter in communication with said control adapter.

52. The node of claim 48 wherein said service is a protocol gateway service, said protocol gateway service having a service adapter in communication with said control adapter.

53. The node of claim 48 wherein said service is a cache service, said cache service having a service adapter in communication with said control adapter.

54. The node of claim 48 wherein said heartbeat events include Global Unique Identifiers of publishers.

55. The node of claim 48 wherein said heartbeat events include time stamps.

56. The node of claim 48 wherein said heartbeat events include information regarding a number of packets received and processed by the node.

57. The node of claim 48 wherein said heartbeat events include information regarding a number of packets in queue in the node.

58. The node of claim 48 wherein said heartbeat events include information regarding a number of packets timed out.

59. The node of claim 48 wherein said heartbeat events include information regarding a rate at which packets are received by the node.

60. A data communication network, comprising:
a first processor having:
a network management application;
an access data base adapter in communication with said network management application and an information bus; and
a database in communication with said network management application and said access database adapter; and
a second processor having:
a master daemon;
a control adapter activated by said master daemon, said control adapter in communication with an information bus over which are published heartbeat events from said control adapter such that subscribing adapters may receive said heartbeat events;
at least one service running on said second processor; and
a service adapter in communication with said service, said service adapter in communication with said control adapter and said information bus over which are published heartbeat events from said service adapter such that subscribing adapters may receive said plurality of heartbeat events.

61. The data communication network of claim 60 further comprising:
an information broker in communication with said information bus, said first processor, and said second processor.

62. The data communication network of claim 60 wherein said heartbeat events include Global Unique Identifiers of publishers.

63. The data communication network of claim 60 wherein said heartbeat events include time stamps.

64. The data communication network of claim 60 wherein said heartbeat events include information regarding a number of packets received and processed by the node.

65. The data communication network of claim 60 wherein said heartbeat events include information regarding a number of packets in queue in the node.

66. The data communication network of claim 60 wherein said heartbeat events include information regarding a number of packets timed out.

67. The data communication network of claim 60 wherein said heartbeat events include information regarding a rate at which packets are received by the node.

68. An apparatus for managing a node of a data communication network, comprising:
means for starting a master daemon;
means for starting a control adapter with said master daemon;
means for starting at least one service with said control adapter, said service including a service adapter in communication with said control adapter;
means for generating a plurality of heartbeat events with said control adapter and said service adapter; and
means for publishing said plurality of heartbeat events to an information bus such that subscribing adapters may receive said plurality of heartbeat events.

69. The apparatus of claim 68 further comprising:
means for restarting said control adapter with said master daemon should said control adapter ever stop publishing said heartbeat events for longer than a predetermined time.

70. The apparatus of claim 68 further comprising:
means for restarting said service adapter with said control adapter should said service adapter ever stop publishing said heartbeat events for longer than a predetermined time.

71. The apparatus of claim 68 further comprising:
means for starting an Authentication, Authorization and Accounting (AAA) service with said control adapter, said AAA service including a service adapter in communication with said control adapter.

72. The apparatus of claim 68 further comprising:
means for starting a Domain Name Service (DNS) with said control adapter, said DNS including a service adapter in communication with said control adapter.

73. The apparatus of claim 68 further comprising:
means for starting a Dynamic Host Configuration Protocol (DHCP) service with said control adapter, said DHCP service including a service adapter in communication with said control adapter.

74. The apparatus of claim 68 further comprising:
means for starting a protocol gateway service with said control adapter, said protocol gateway service including a service adapter in communication with said control adapter.

75. The apparatus of claim 68 further comprising:
means for starting a cache service with said control adapter, said cache service including a service adapter in communication with said control adapter.

76. The apparatus of claim 68 further comprising:
means for signaling at said control adapter an error occurrence within said control adapter; and
means for publishing an exception event on to said information bus.

77. The apparatus of claim 68 further comprising:
means for signaling at said control adapter when said control adapter receives two or more conflicting signals from two or more sources within a specified period of time; and
means for publishing a race event on to said information bus.

78. The apparatus of claim 68 further comprising:
means for signaling at said control adapter the identity of said control adapter in response to said control adapter receiving a signal requiring identity status; and
means for publishing an identity event of said control adapter on to said information bus.

79. The apparatus of claim 68 further comprising:
means for signaling at said control adapter the configuration data for said service adapter; and
means for publishing a configuration event on to said information bus.

80. The apparatus of claim 68 further comprising:
means for signaling at said service adapter an error occurrence within said service; and
means for publishing an exception event on to said information bus.

81. The apparatus of claim 68 further comprising:
means for signaling at said service adapter the identity of said service adapter in response to said service adapter receiving a signal requiring identity status; and means for publishing an identity event on to said information bus.

82. The apparatus of claim 68 wherein said heartbeat events include Global Unique Identifiers of publishers.

83. The apparatus of claim 68 wherein said heartbeat events include time stamps.

84. The apparatus of claim 68 wherein said heartbeat events include information regarding a number of packets received and processed by the node.

85. The apparatus of claim 68 wherein said heartbeat events include information regarding a number of packets in queue in the node.

86. The apparatus of claim 68 wherein said heartbeat events include information regarding a number of packets timed out.

87. The apparatus of claim 68 wherein said heartbeat events include information regarding a rate at which packets are received by the node.

88. An apparatus for managing a data communication network, comprising:
    means for means for starting a master daemon;
    means for means for starting a control adapter with said master daemon;
    means for means for starting at least one service with said control adapter, said service including a service adapter in communication with said control adapter;
    means for generating a plurality of heartbeat events with said control adapter and said service adapter; and
    means for publishing said plurality of heartbeat events to an information bus such that subscribing adapters may receive said plurality of heartbeat events, said information bus in communication with a network management application and an access database adapter, said access data base adapter in communication with said network management application.

89. The apparatus of claim 88 further comprising:
    means for restarting said control adapter with said master daemon should said control adapter ever stop publishing said heartbeat events for longer than a predetermined time.

90. The apparatus of claim 88 further comprising:
    means for restarting said service adapter with said control adapter should said service adapter ever stop publishing said heartbeat events for longer than a predetermined time.

91. The apparatus of claim 88 further comprising:
    means for starting an Authentication, Authorization and Accounting (AAA) service with said control adapter, said AAA service including a service adapter in communication with said control adapter.

92. The apparatus of claim 88 further comprising:
    means for starting a Domain Name Service (DNS) with said control adapter, said DNS including a service adapter in communication with said control adapter.

93. The apparatus of claim 88 further comprising:
    means for starting a Dynamic Host Configuration Protocol (DHCP) service with said control adapter, said DHCP service including a service adapter in communication with said control adapter.

94. The apparatus of claim 88 further comprising:
    means for starting a protocol gateway service with said control adapter, said protocol gateway service including a service adapter in communication with said control adapter.

95. The apparatus of claim 88 further comprising:
    means for starting a cache service with said control adapter, said cache service including a service adapter in communication with said control adapter.

96. The apparatus of claim 88 further comprising:
    means for signaling at said control adapter an error occurrence within said control adapter; and
    means for publishing an exception event on to said information bus.

97. The apparatus of claim 88 further comprising:
    means for signaling at said control adapter when said control adapter receives two or more conflicting signals from two or more sources within a specified period of time; and
    means for publishing a race event on to said information bus.

98. The apparatus of claim 88 further comprising:
    means for signaling at said control adapter the identity of said control adapter in response to said control adapter receiving a signal requiring identity status; and
    means for publishing an identity event of said control adapter on to said information bus.

99. The apparatus of claim 88 further comprising:
    means for signaling at said control adapter the configuration data for said service adapter; and
    means for publishing a configuration event on to said information bus.

100. The apparatus of claim 88 further comprising:
    means for signaling at said service adapter an error occurrence within said service; and
    means for publishing an exception event on to said information bus.

101. The apparatus of claim 88 further comprising:
    means for signaling at said service adapter the identity of said service adapter in response to said service adapter receiving a signal requiring identity status; and
    means for publishing an identity event on to said information bus.

102. The apparatus of claim 88 further comprising:
    means for signaling at said access database adapter configuration data for said service adapter; and
    means for publishing a configure event to said information bus.

103. The apparatus of claim 88 further comprising:
    means for signaling at said access database adapter configuration data for said control adapter; and
    means for publishing a configure event to said information bus.

104. The apparatus of claim 88 further comprising:
    means for signaling at said access database adapter for said service to begin operating; and
    means for publishing a start event on said information bus.

105. The apparatus of claim 88 further comprising:
    means for signaling at said access database adapter for said service to stop; and
    means for publishing a stop event on to said information bus.

106. The apparatus of claim 88 further comprising:
    means for signaling at said access database adapter for the identity of said control adapter; and
    means for publishing an identity event on to said information bus.

107. The apparatus of claim 88 further comprising:

means for signaling at said access database adapter for the identity of said service adapter; and means for publishing an identity event on to said information bus.

108. The apparatus of claim 88 further comprising:

means for signaling at said access database adapter for said control adapter to execute a script; and means for publishing a DoCommand event on to said information bus.

109. The apparatus of claim 88 wherein said heartbeat events include Global Unique Identifiers of publishers.

110. The apparatus of claim 88 wherein said heartbeat events include time stamps.

111. The apparatus of claim 88 wherein said heartbeat events include information regarding a number of packets received and processed by the node.

112. The apparatus of claim 88 wherein said heartbeat events include information regarding a number of packets in queue in the node.

113. The apparatus of claim 88 wherein said heartbeat events include information regarding a number of packets timed out.

114. The apparatus of claim 88 wherein said heartbeat events include information regarding a rate at which packets are received by the node.

115. A program storage device readable by a machine, tangibly embodying a program of instructions executable by the machine to perform a method for managing a node of a data communication network, said method comprising:

starting a master daemon;

starting a control adapter with said master daemon;

starting at least one service with said control adapter, said service including a service adapter in communication with said control adapter;

generating a plurality of heartbeat events with said control adapter and said service adapter; and publishing said plurality of heartbeat events to an information bus such that subscribing adapters may receive said plurality of heartbeat events.

116. A program storage device readable by a machine, tangibly embodying a program of instructions executable by the machine to perform a method for managing a data communication network, said method comprising:

starting a master daemon;

starting a control adapter with said master daemon;

starting at least one service with said control adapter, said service including a service adapter in communication with said control adapter;

generating a plurality of heartbeat events with said control adapter and said service adapter; and publishing said plurality of heartbeat events to an information bus such that subscribing adapters may receive said plurality of heartbeat events, said information bus in communication with a network management application and an access database adapter, said access data base adapter in communication with said network management application.

117. A node within a data communications network, comprising:

a master daemon process running on a processor within the node;

a control adapter process activated by the master daemon, said control adapter process in communication with an information bus on which said control adapter process publishes heartbeat events generated by said control adapter process while it is operating such that subscribing adapters may receive said heartbeat events;

a service adapter process activated by the control adapter, said service adapter process in communication with said control adapter process to which said service adapter process transmits heartbeat events generated by said service adapter process while it is operating; and a service process activated by the service adapter process, said service process in communication with said service adapter process.

118. The node of claim 117 wherein said service is an Authentication, Authorization and Accounting (AAA) service, said AAA having a service adapter in communication with said information broker.

119. The node of claim 117 wherein said service is a Domain Name Service (DNS), said DNS having a service adapter in communication with said control adapter.

120. The node of claim 117 wherein said service is a Dynamic Host Configuration Protocol (DHCP) service, said DHCP service having a service adapter in communication with said control adapter.

121. The node of claim 117 wherein said service is a protocol gateway service, said protocol gateway service having a service adapter in communication with said control adapter.

122. The node of claim 117 wherein said service is a cache service, said cache service having a service adapter in communication with said control adapter.

123. The apparatus of claim 117 wherein said heartbeat events include Global Unique Identifiers of publishers.

124. The apparatus of claim 117 wherein said heartbeat events include time stamps.

125. The apparatus of claim 117 wherein said heartbeat events include information regarding a number of packets received and processed by the node.

126. The apparatus of claim 117 wherein said heartbeat events include information regarding a number of packets in queue in the node.

127. The apparatus of claim 117 wherein said heartbeat events include information regarding a number of packets timed out.

128. The apparatus of claim 117 wherein said heartbeat events include information regarding a rate at which packets are received by the node.

* * * * *

UNITED STATES PATENT AND TRADEMARK OFFICE
CERTIFICATE OF CORRECTION

PATENT NO. : 6,718,376 B1
DATED : April 6, 2004
INVENTOR(S) : Jie Chu, Aravind Sitaraman and Leslie Alan Thomas It is certified that error appears in the above-identified patent and that said Letters Patent is hereby corrected as shown below:

Column 17,
Lines 21, 22 and 24, delete "means for".

Signed and Sealed this

Second Day of November, 2004

JON W. DUDAS
*Director of the United States Patent and Trademark Office*